(12) United States Patent
Modai et al.

(10) Patent No.: US 10,986,155 B2
(45) Date of Patent: Apr. 20, 2021

(54) SEGMENTED VIDEO CODEC FOR HIGH RESOLUTION AND HIGH FRAME RATE VIDEO

(71) Applicant: Avaya Inc., Basking Ridge, NJ (US)

(72) Inventors: Ori Modai, Ramat Hasharon (IL); Gal Eliraz-Levonai, Tel-Aviv (IL)

(73) Assignee: Avaya Inc., Basking Ridge, NJ (US)

(*) Notice: Subject to any disclaimer, the term of this patent is extended or adjusted under 35 U.S.C. 154(b) by 952 days.

(21) Appl. No.: 14/500,066

(22) Filed: Sep. 29, 2014

(65) Prior Publication Data
US 2016/0094606 A1   Mar. 31, 2016

(51) Int. Cl.
| | |
|---|---|
| *H04B 1/66* | (2006.01) |
| *H04L 29/06* | (2006.01) |
| *H04N 19/20* | (2014.01) |
| *H04N 19/17* | (2014.01) |
| *H04N 19/12* | (2014.01) |
| *H04N 19/167* | (2014.01) |

(52) U.S. Cl.
CPC .......... *H04L 65/607* (2013.01); *H04N 19/12* (2014.11); *H04N 19/167* (2014.11); *H04N 19/17* (2014.11); *H04N 19/20* (2014.11)

(58) Field of Classification Search
CPC .... H04N 21/4728; H04N 19/82; H04N 19/90; H04N 19/96; H04N 2005/2255; H04N 21/2146; H04N 21/234327; H04N 19/119; H04N 19/17; H04N 19/167; H04N 19/176; H04N 19/44; H04N 19/46; H04N 19/63; H04N 19/70; H04N 21/23439; H04N 21/2365

USPC ......................................................... 375/240
See application file for complete search history.

(56) References Cited

U.S. PATENT DOCUMENTS

| | | | | |
|---|---|---|---|---|
| 5,623,308 | A | * | 4/1997 | Civanlar ................. H04N 7/56 375/240.01 |
| 2013/0307942 | A1 | * | 11/2013 | Dini ................... H04N 5/44591 348/51 |
| 2014/0059166 | A1 | * | 2/2014 | Mann ...................... H04L 65/60 709/217 |
| 2014/0204107 | A1 | * | 7/2014 | Laksono ................ H04N 19/46 345/547 |
| 2014/0313316 | A1 | * | 10/2014 | Olsson ................... H04N 7/183 348/84 |
| 2016/0165309 | A1 | * | 6/2016 | Van Brandenburg ........ H04N 21/4728 725/116 |

* cited by examiner

*Primary Examiner* — Masum Billah (57) ABSTRACT

Embodiments disclosed herein provide systems, methods, and computer readable media for a segmented video codec for high resolution and high frame rate video. In a particular embodiment, a method of encoding a composite video stream provides identifying a first portion of an image of a video stream for encoding using first parameters and a second portion of the image of the video stream for encoding using second parameters. The method further provides segmenting the first portion of the image into one or more first tiles and the second portion of the image into one or more second tiles. The method further provides encoding the first tiles using the first parameters and the second tiles using the second parameters and, after the encoding, combining the first tiles and the second tiles into the composite video stream.

17 Claims, 6 Drawing Sheets

SEGMENTED VIDEO CODEC FOR HIGH RESOLUTION AND HIGH FRAME RATE VIDEO

TECHNICAL BACKGROUND

Display screens continue to increase in resolution. Similarly, images displayed on those screens also increase in resolution in order to fully realize the benefits of the higher resolution displays. Regardless of whether these images are static or moving (e.g. video), increasing image resolution typically increases both the size of the image files and the processing power needed to encode or decode the images. In other words, higher resolution images take up more storage space, use more bandwidth to transfer, and use more processing resources for encoding and decoding than do lower bandwidth images. Moreover, depending on display size, there exists a distance from the display where higher resolutions cease to be discernable to the human eye. Similarly, in the case of video images, higher frame rates also increase the use of the above resources.

One standard display resolution is commonly referred to as 1080p or full HD and has a resolution of 1920×1080. Newer displays, however, may have higher resolutions including 3840×2160, which is commonly referred to as 4K or Ultra HD. While Ultra HD allows for higher resolution images, due in part to the additional resources listed above, Ultra HD may not be desirable in all situations. Moreover, the same image may include portions that would benefit from Ultra HD and portions that would not. For example, some displayed information may have details that would benefit from being shown in Ultra HD but other information may not, although, all the information is displayed at the same resolution. In other examples, a certain parts of a video image contain motion that requires a higher frame rate than more static parts of the video image and a processor encoding or decoding the video may not be able to handle Ultra HD at high frame rates.

Overview

Embodiments disclosed herein provide systems, methods, and computer readable media for a segmented video codec for high resolution and high frame rate video. In a particular embodiment, a method of encoding a composite video stream provides identifying a first portion of an image of a video stream for encoding using first parameters and a second portion of the image of the video stream for encoding using second parameters. The method further provides segmenting the first portion of the image into one or more first tiles and the second portion of the image into one or more second tiles. The method further provides encoding the first tiles using the first parameters and the second tiles using the second parameters and, after the encoding, combining the first tiles and the second tiles into the composite video stream.

In some embodiments, the first parameters comprise a first frame rate and a first resolution and the second parameters include a second frame rate and a second resolution.

In some embodiments, the first frame rate is higher than the second frame rate and the first resolution is lower than the second resolution.

In some embodiments, the composite video stream comprises a video having the first frame rate and the second resolution.

In some embodiments, the method further provides transferring the composite video stream to a decoder system, wherein the decoder system decodes the composite video stream for display.

In some embodiments, the decoder system segments the composite video stream, based on tile segment information, into the first and second tiles before decoding the first tiles based on the first parameters and decoding the second tiles based on the second parameters.

In some embodiments, the method further provides transferring the tile segment information to the decoder system using a supplemental enhancement information (SEI) message.

In some embodiments, the encoding is performed using the H.265 codec.

In another embodiment, a non-transitory computer readable medium is provided having instructions stored thereon. When executed by an encoder system, the instructions direct the encoder system to perform a method of encoding a composite video stream. The method includes identifying a first portion of an image of a video stream for encoding using first parameters and a second portion of the image of the video stream for encoding using second parameters. The method further includes segmenting the first portion of the image into one or more first tiles and the second portion of the image into one or more second tiles. The method further includes encoding the first tiles using the first parameters and the second tiles using the second parameters and, after the encoding, combining the first tiles and the second tiles into the composite video stream.

In yet another embodiment, a non-transitory computer readable medium is provided having instructions stored thereon. When executed by an decoder system, the instructions direct the decoder system to perform a method of decoding a composite video stream. The method includes receiving the composite video stream, wherein the composite video stream comprises a combination of one or more first tiles of an image of a video stream encoded using first parameters and one or more second tiles of the image of the video stream encoded using second parameters. The method further includes segmenting the composite video stream into the first and second tiles and, after segmenting, decoding the first tiles based on the first parameters and decoding the second tiles based on the second parameters. After decoding, the method includes combining the first tiles and the second tiles for display of the image of the video stream.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
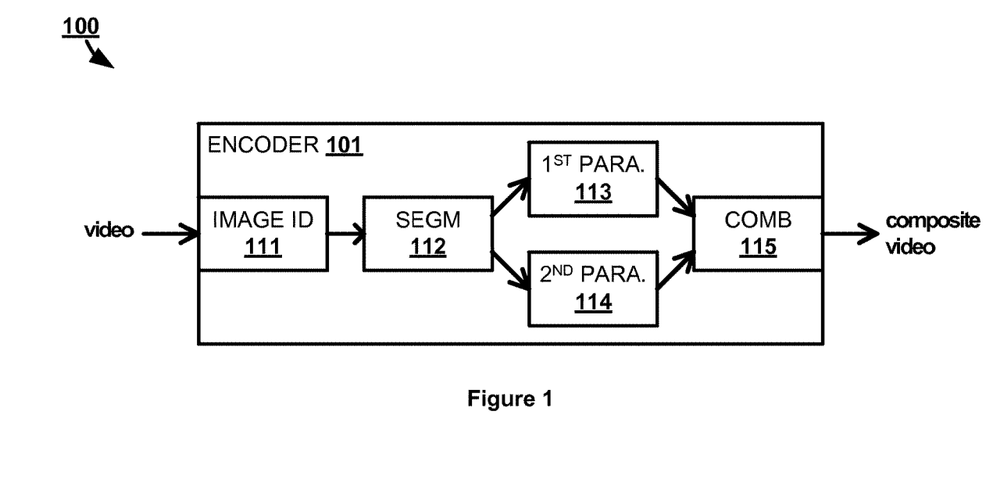
FIG. 1 illustrates an encoder operational scenario in an implementation.

FIG. 1 illustrates a representative encoding operational scenario 100 in which video is segmented for high resolution and high frame rate encoding. In operational scenario 100, a video encoder 101 is provided, which includes image portion identifier module 111, image segmentation module 112, first parameters encoding module 113, second parameters encoding module 114, and combination module 115. Modules 111-115 may be implemented by software, firmware, or other type of processing instructions, that direct a processor system to perform the functionality disclosed herein, may be implemented in dedicated hardware circuitry, or may be implemented in some combination thereof.

In operational scenario 100, video having image elements that would benefit from one or more encoding parameters (e.g. resolution, frame rate, etc.) are encoded separately from elements having one or more different encoding parameters. For example, a video image, which is produced by generating a sequence of image frames, may be generated by including both video captured by a video camera and other visual information (e.g. text, writing, logos, photos, slides, whiteboard, etc.) outside of the captured video into a single video image. This may be the situation when live captured video is overlaid on top of other visual information and the resultant image is compiled into a video stream. The camera video may require a higher frame rate to ensure motion in the video is smooth when viewing while the other information may be more static or otherwise not require the smoothness allowed by a high frame rate. Additionally, the captured video may be captured at a lower resolution than the surrounding image information.

Based on the video image described above, encoding the entire video image at the higher frame rate of the captured video and the higher resolution of the other visual information would generate an encoded video having unneeded data. That is, the encoded video would have data representing a greater resolution of the captured video than the resolution with which the video was captured. Likewise, the encoded video would have data representing more frames than are necessary to present the other visual information. Accordingly, the encoded video would be larger and require more bandwidth than would an encoded video without the unnecessary data. Likewise, the processing resources needed to encode the entire visual image at the higher frame rate and the higher resolution are greater.

Operational scenario 100 therefore receives a video stream for encoding and image portion identifier module 111 identifies portions of the video image that can be encoded using one set of parameters, the first parameters, and portions of the video that can be encoded using a different set of parameters, the second parameters. The parameters each include one or more specifications for how video should be included, such as frame rate, resolution, color/grey scale, bit rate, and the like. Segmentation module 112 segments the video image into one or more tiles representing portions of the video image for encoding using the first parameters and one or more tiles representing portions of the video image for encoding using the second parameters.

It should be understood that video image, as used herein, includes a sequence of frames of the video, as opposed to a single frame. Thus, when the video image is segmented into tiles, each tile is positioned in the same place for each frame that produces the video image and, therefore, span the multiple frames that comprise the video stream.

Once segmented into tiles, the first parameter tiles are encoded using the first parameters in first parameters encoding module 113 and the second parameters tiles are encoded using the second parameters encoding module 114. In other words, instead of the entire video image being encoded as a whole using a single set of parameters, the tiles are encoded, which allows different tiles to be encoded using different parameters. Both encoding modules use the same codec to encode the tiles but are differentiated in that they use the first and second parameters, respectively, for that encoding. Moreover, since each encoding module may process multiple tiles for the image, each encoding module may encode tiles in parallel using multiple processors or processor cores. After encoding, combination module 115 combines the encoded tiles back into a single encoded video image and outputs the resultant composite video stream.

The parameters of the composite video stream include the highest quality parameters between the first and second parameters even though some of the image is not necessarily encoded with those highest quality parameters. In other words, the composite video stream comprises a video in the format produced by the codec having the higher quality parameters between the first and second parameters. Using the example from above, the composite video has the higher frame rate of the captured video while having the resolution of the other visual information, although other examples may have additional parameters affecting quality. Moreover, since the composite video stream generated by operational scenario 100 looks like any other video generated by the codec, the composite video stream can be decoded by a conventional decoder for that codec. However, essentially reversing the encoding process by decoding the video stream in tiles, as described below, allows a decoding system or device to use less processing power to decode a high resolution, high frame rate video stream than would a conventional decoder.

The composite video stream may be stored or may be transferred over a communication network, as a single file or streamed during real time communications or other streaming video distribution. Accordingly, it should be understood that the term video stream as used herein refers to the stream of video passing through encoder 101 for encoding (or decoder 301 below for decoding) but that video stream is not necessarily transferred as streaming video.

Figure 2:
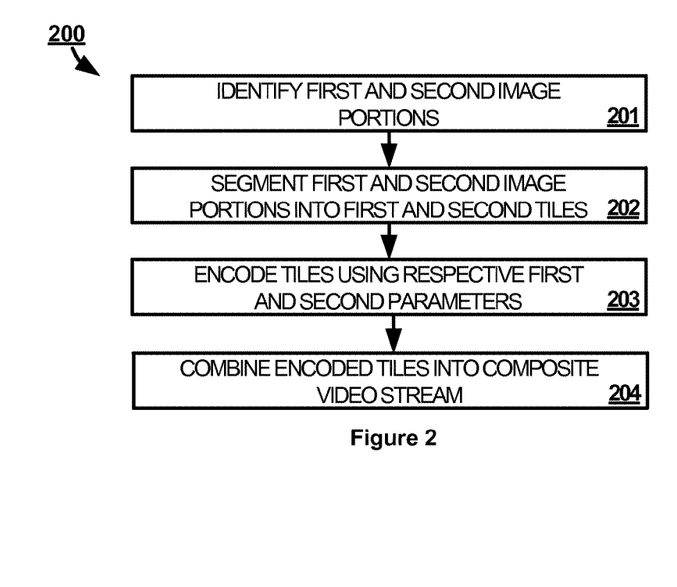
FIG. 2 illustrates an encoding method in an implementation.

FIG. 2 illustrates a method 200 for encoding a composite video stream using different parameters. Method 200 includes identifying a first portion of an image of a video stream for encoding using first parameters and a second portion of the image of the video stream for encoding using second parameters (step 201). The first and second portions may be identified in information included with the video stream (e.g. designating the portions of the video image)

from the source (e.g. compiler) of the video stream, the portions may be input into the encoder independently (e.g. a captured video may be independent of the other visual information that will make up the composite video), the video image may be processed to differentiate the first and second portions, or by any other means by which different image portions may be identified.

Once the first and second portions are identified, method 200 segments the first portion of the image into one or more first tiles and the second portion of the image into one or more second tiles (step 202). Depending on the codec used, the tiles may comprise rectangular blocks having sides that comprise lines crossing the entire width and height of the video image, although, other codecs may use different tile shapes. Once the tiles are segmented, method 200 encodes the first tiles using the first parameters and the second tiles using the second parameters (step 203). As noted above, the parameters may include anything that affects the quality of the encoded video.

After the encoding, the first tiles and the second tiles are combined into the composite video stream (step 204). The composite video stream is a video having the higher quality parameters of the first and second parameters. When combining, step 204 may blend the first and second encoded tiles in the time domain and the spatial domain. For example, in the time domain, if the first tiles have a higher frame rate than the second tiles, then the portion of the video image made up of the second tiles is not updated each frame as are the first tiles having the higher frame rate. In the spatial domain, the lower resolution tiles may be placed within a portion of the higher resolution composite video image having a resolution corresponding to that lower resolution (e.g. a tile comprising a resolution of 1920×1080 pixels may take up that same amount of pixels within a 3840×2160 composite video image), although, some examples may employ scaling of the lower resolution tile.

It should be understood that the operation and methods described above and below can be performed on video images having portions corresponding to more than two sets of parameters. For example, a video image may be separated in to four separate tile sets with each set having its respective first, second, third, and fourth parameters. Each of the four tile sets are therefore encoded, and decoded, using their respective parameters.

Figure 3:
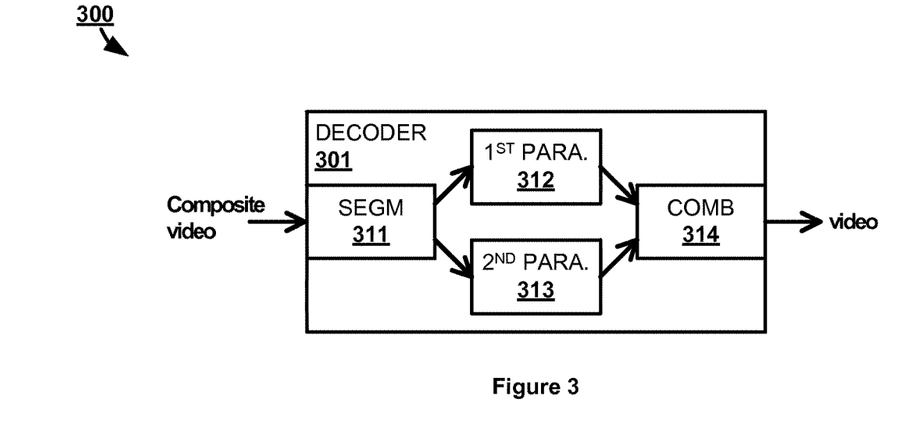
FIG. 3 illustrates a decoder operational scenario in an implementation.

FIG. 3 illustrates a representative encoding operational scenario 300 in which a composite video stream is segmented for decoding. In operational scenario 300, a video decoder 301 is provided, which includes image segmentation module 311, first parameters decoding module 312, second parameters decoding module 313, and combination module 314. Modules 311-314 may be implemented by software, firmware, or other type of processing instructions, that direct a processor system to perform the functionality disclosed herein, may be implemented in dedicated hardware circuitry, or may be implemented in some combination thereof.

While a composite video stream generated in accordance with the embodiments above is able to be decoded by a conventional decoder using the same codec, decoding tiles using decoder 301 in a manner similar to the way the video was encoded allows the composite video stream to be decoded using less processing resources with one or more decoders.

In operational scenario 300, the composite video is fed into decoder 301 and image segmentation module 311 separates the composite video image into the first and second tiles. Module 311 may differentiate the tiles based on information describing the tiles that was generated by the encoder when encoding the composite video stream and received along with the composite video stream. For example, such information may be transferred in a supplemental enhancement information (SEI) message, which is part of the H.265 video codec, however other means of transferring the information may also be used.

After segmenting the composite video stream, the first tiles are decoded in first parameters decoding module 312 based on the same first parameters in which the first tiles were encoded. Likewise, the second tiles are decoded in second parameters decoding module 313 based on the same parameters in which the second tiles were encoded. Thus, instead of decoding the entire composite video image based on the parameters of the fully compiled composite video stream, each image tile is decoded using a decoder catered for the parameters of that tile. Upon completion of decoding, the decoded tiles are combined in combination module 314, both spatially and temporally, for output to a display.

It should be understood that, as with the encoder above, the composite video stream decoded by decoder 301 may include tiles with decoding parameters in addition to the first and second parameters described in this embodiment. In those scenarios, decoder 301 may selectively choose which tile sets are decoded using their individual parameters rather than parameters for the video as a whole. This selective decoding still requires a minimum set of tiles to be decoded such that synchronization with the encoder is maintained.

Figure 4:
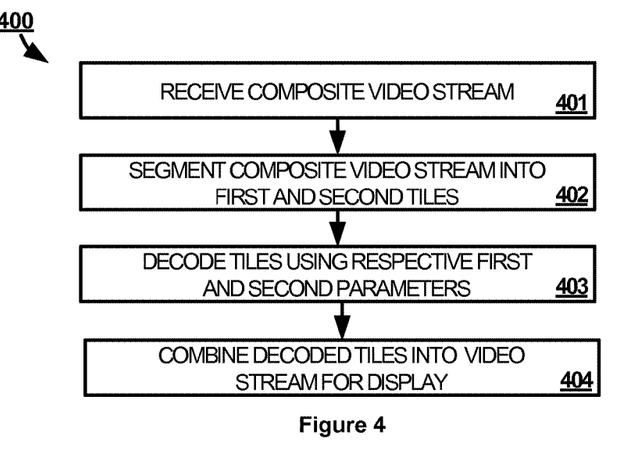
FIG. 4 illustrates a decoding method in an implementation.

FIG. 4 illustrates a method 400 for decoding a composite video stream using different parameters. Method 400 includes receiving the composite video stream (step 401). The composite video stream may be received over a communication network via a network communication interface or may be received from a local storage medium. The composite video stream is then segmented into the first and second tiles (step 402). As noted above, the tiles may be identified based on information received with the composite video stream. After segmenting, the first tiles are decoded based on the first parameters and the second tiles are decoded based on the second parameters (step 403). After decoding, method 400 combines the first tiles and the second tiles for display of the image of the video stream (step 404).

Figure 5:
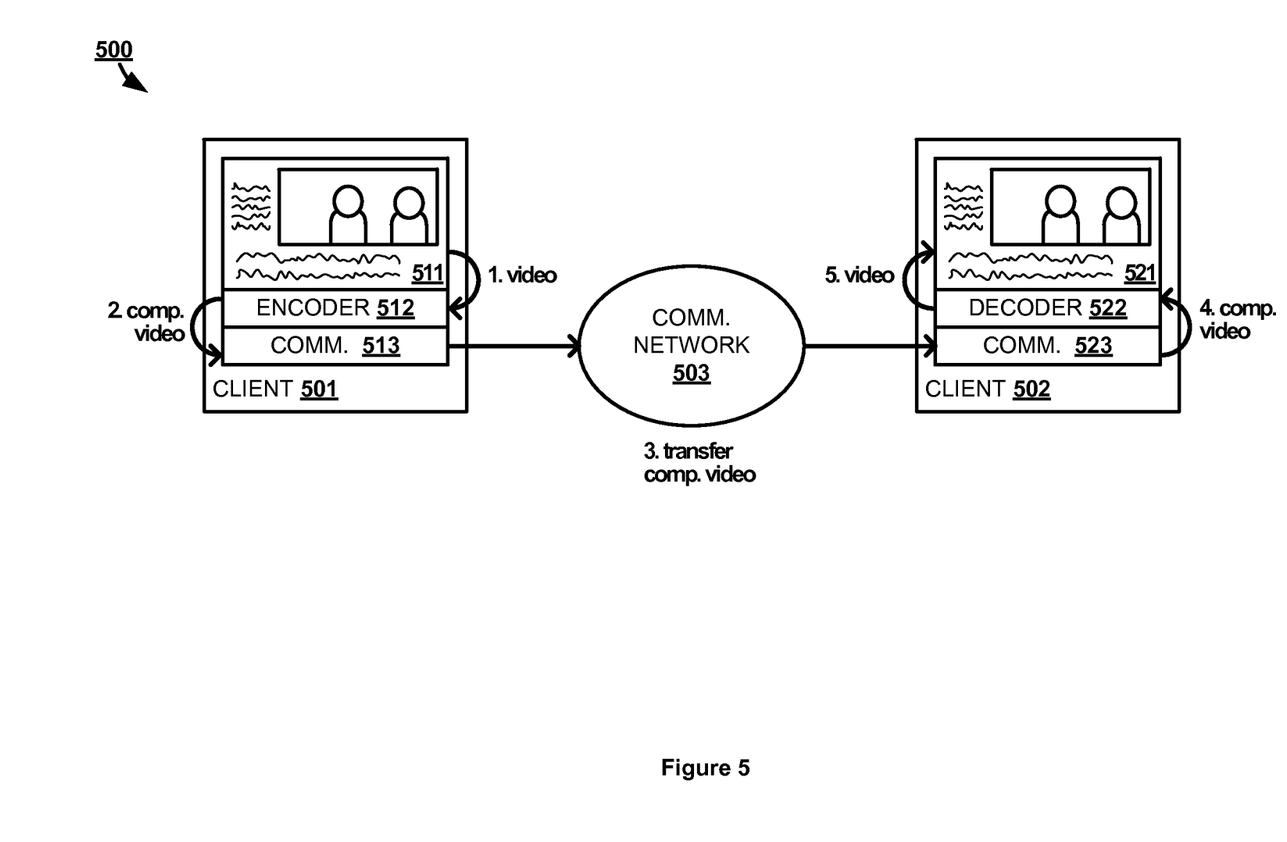
FIG. 5 illustrates a multi-client operational scenario in an implementation.

FIG. 5 illustrates a multi-client operational scenario 500 in which a composite video stream is encoded and decoded. Operational scenario 500 provides client device 501, client device 502, and communication network 503. Client device 501 includes display 511, video encoder 512, and communication interface 513. Client device 502 includes display 521, video decoder 522, and communication interface 513. Communication network includes comprises network elements, such as switches, wireless access nodes, Internet routers, network gateways, application servers, computer systems, communication links, or some other type of communication equipment—including combinations thereof.

In operational scenario 500, video is streamed from client device 501 to client device 502 as part of a real time communication. The client devices 501 and 502 may be personal computers, tablets, smartphones, video conference end point, or any other type of computing device—including combinations thereof. The real time communication may be a video conferencing session or some other form of real time presentation including video streaming. In particular, the real time communication includes both live video captured of presenters and information of an interactive whiteboard. Scenario 500 shows the live video positioned over the whiteboard on display 521, however, display 521 need not present the video and whiteboard in this manner before encoding and transmission to client device 502. Rather, display 521 may simply display the whiteboard with which the user(s) of client device 501 interact and may handle the live video in the background.

In step 1, the video stream is sent through to encoder 512 for encoding. Encoder 101 may be an example of encoder 512 in client device 501. The video may be sent to the video already compiled into a video image (i.e. with the live video overlaid on the whiteboard) or the video may be transferred to encoder 512 in separate components (i.e. the white board and the live video distinct from one another). In this example, encoder 512 is configured to encode the whiteboard in 4K resolution at 3.5 frames per second (fps) and the live video in full HD 1080P at 30 fps. These parameters may be defined by a user, may be determined based on the resolution and frame rate of the video components (i.e. the whiteboard data and the live video) as received by encoder 512, or by some other means. The whiteboard in this example will be encoded at a higher resolution because more visual detail may be present in the whiteboard's content while the live video may be captured only at full HD resolution (or otherwise down converted for the purposes of the real time communication session). Similarly, the whiteboard may be updated infrequently or not at all, which allows for a low frame rate when converting its visual contents into a video stream. In other words, the whiteboard content is merely visual data and does not require a high frame rate when converted to a video stream. In contrast, live video requires a higher frame rate in order for the human eye to perceive that the sequence of images making up the live video are representing fluid motion.

To conserve the amount of data and processing resources used to encode the video stream, encoder 512 identifies the whiteboard portions of the video image and the live video portions of the video image and segments those portions into tiles. In this example, encoder 512 uses the H.265 video codec which allows for separating a video image into tiles, although other codecs having segmenting capabilities may also be used.

Figure 6:
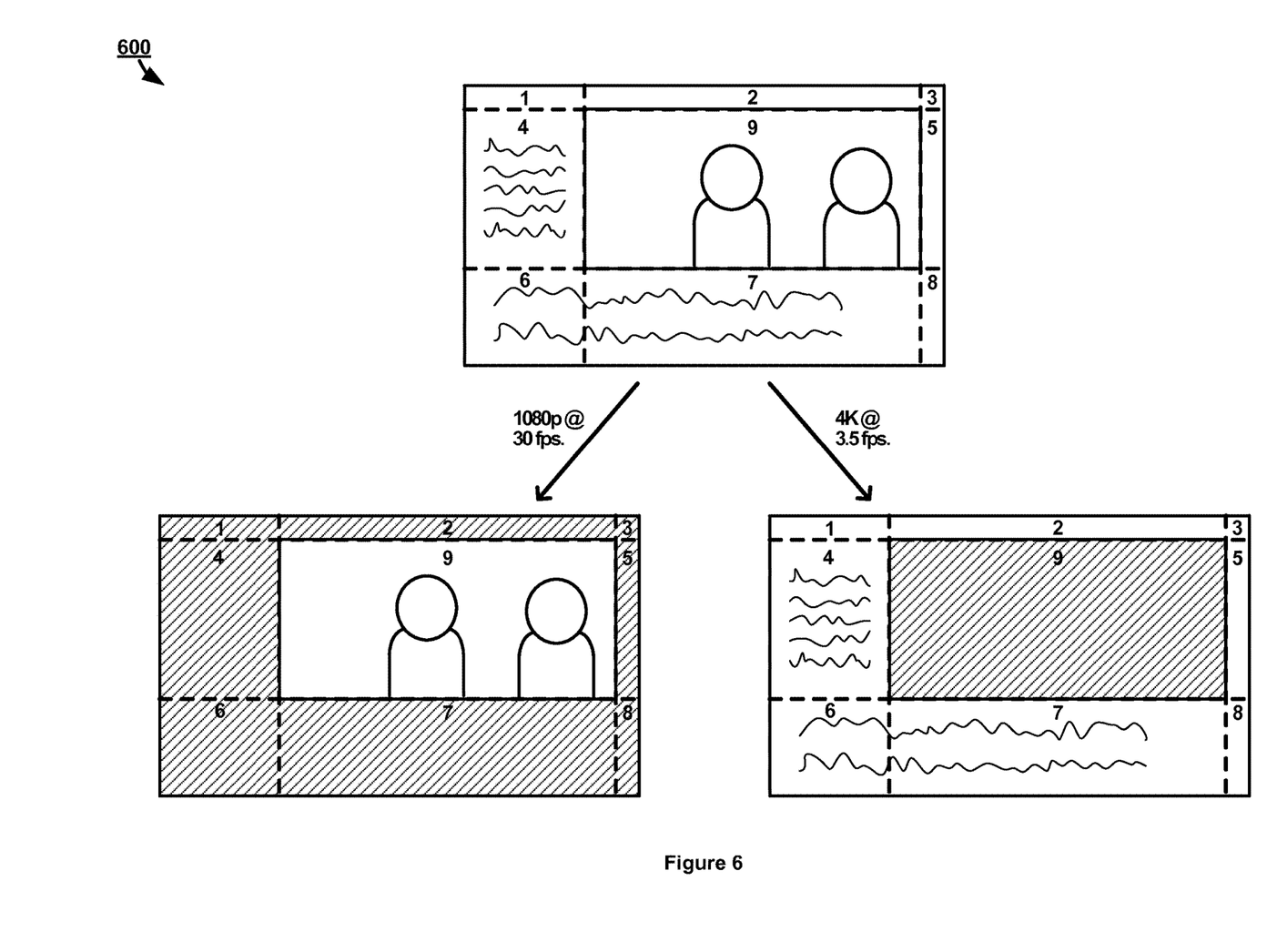
FIG. 6 illustrates image segmentation in an operational scenario.

FIG. 6 illustrates an example of image segmentation scenario 600 in operational scenario 500. The video image is segmented into 9 tiles. H.265 requires that the lines defining the tiles span the entire image, however, other codecs may not have such a requirement. For example, in other codecs, tiles 6-8 may be combined into one tile. Encoder 512 determines that tiles 1-8 are part of whiteboard content that should be encoded in 4K at 3.5 fps and the tile 9 is part of the live video that should be encoded in full HD at 30 fps. Therefore, encoder 512 encodes each of tiles 1-8 independently in 4K at 3.5 fps and encodes tile 9 in full HD at 30 fps. While image segmentation scenario 600 keeps the spatial orientation of the tiles intact to show how the whiteboard content is separated from the live video, this spatial orientation is irrelevant when the tiles are encoded since the tiles are encoded independently. For instance, tile 5 is encoded just as though image frames of that tile make up the entire video image and that video image has a resolution equal to tile 5's portion of the full 4K image at 3.5 fps (e.g. tile 5 may comprise a 256×1080 portion of the 4K image and is therefore encoded as a 256×1080 video). After encoding, the tiles are combined spatially and temporally back into a single video image as H.265 video in 4K resolution at 30 fps.

Figure 7:
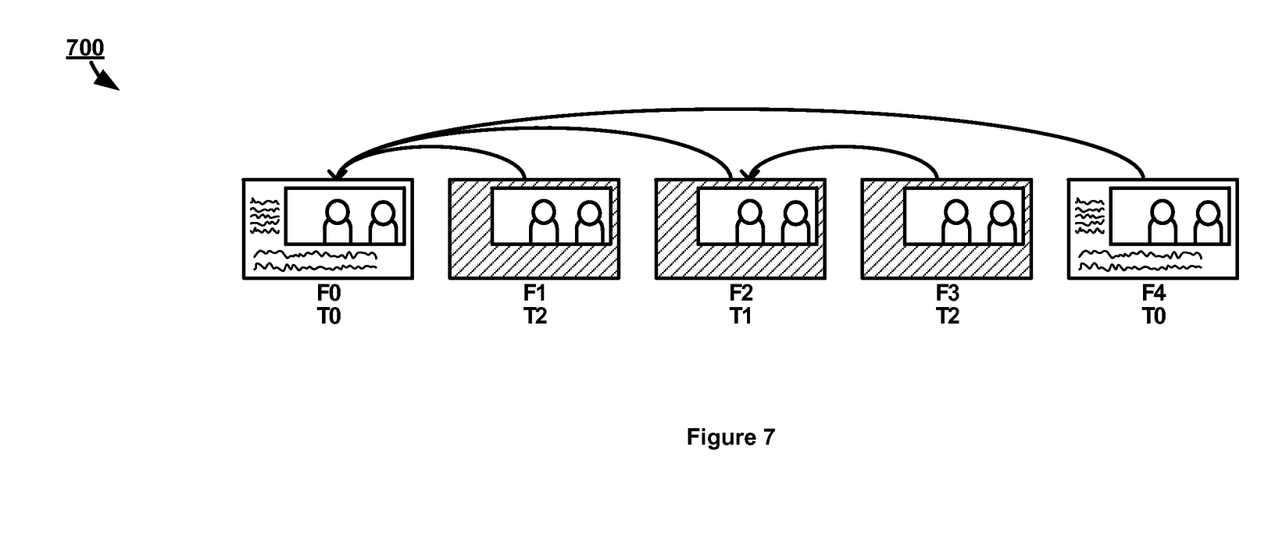
FIG. 7 illustrates an image frame sequence in an operational scenario.

FIG. 7 illustrates an image frame sequence 700 when combining the encoded tiles in operational scenario 500. Frame sequence 700 illustrates how frames of a video stream are temporally combined. However, for clarity of illustration, the frames of FIG. 7 do not represent the total number of frames present for 30 fps video.

Sequence 700 includes 5 frames of the video stream numbered F0-F5, wherein the frame numbers correspond to the order in which the frame is in a sequence of video frames. The tiles have already been spatially placed in their proper positions to reproduce the original video image. As shown, all of frames F0-F5 include information updating the image of the live video. Each frame refers back to a previous frame, as is common during video coding, since the differences between frames use less data than an entire frame. In particular, the frames each correspond to a temporal layer. Frame F0 is of layer T0 because frame F0 is referred to, either directly or indirectly, by frames F1-F4.

Frame F4 is similarly of layer T0 since four frames, which are not illustrated, also refer to frame F4. Frame F2 is of layer T1 since it is referred to by only one other frame, F3. And finally, Frames F1 and F3 are of the highest layer, T2, since no other frames refer to either of frames F1 or F2.

Unlike the live video, the whiteboard information is only updated at frames F0 and F4 since the white board information has a much lower frame rate and, therefore, does not require updates each time the live video is updated. As noted above, in a true 30 fps verses 3.5 fps encoding, there would exist more than 3 frames in between F0 and F4 where only the live video frames are updated. Regardless, when temporally combining the tiles to produce a 4K at 30 fps H.265 video stream, the frames that do not include whiteboard frame update information include information that indicates the whiteboard part of the image frame has not changed, which uses a negligible amount of data. Thus, even the frames that do not update the whiteboard information still comprise enough information to generate a full 4K resolution image though the whiteboard portion of the frame merely indicates that previous image information should still be used.

Referring back to operational scenario 500, after encoding by encoder 512, the encoded composite video stream passes to communication interface 513 at step 2. Encoder 512 further passes an SEI message that indicates information about the tiles that make up the composite video stream, such as tile positioning within the image and the parameters with which each tile is encoded. Communication interface 513 then transfers the composite video stream and the SEI message over communication network 503 to communication interface 523 of client device 502 in step 3. It should be understood that additional client devices may also be participating in the video conference and may therefore also receive the composite video and SEI message. If the additional client devices do not support SEI messages, the additional client devices simply decode the received composite video stream as they would normally decode a video stream in the same format. Similarly, as computing system, such as a conferencing server, may facilitate the distribution of video between client devices.

Step 4 passes the composite video stream and SEI message to decoder 522. Decoder 522 may be a conventional H.265 decoder that decodes the composite video stream as standard 4K at 30 fps stream. However, ideally, decoder 522 is an example of decoder 301 and will reverse the encoding process to more efficiently decode the composite video. That is, decoder 522 uses the SEI message information to separate the image of the composite video stream into tiles 1-9 as shown in FIG. 6. Then the whiteboard tiles 1-8 are individually decoded at 4K and 3.5 fps and the live video is decoded in full HD at 30 fps. After decoding the tiles are recombined to display the video image on display 521 at step 5.

It should be understood that operational scenario 500 is performed continually during the video conference because, as live video is continually captured and as white board updates occur, the resulting video must continually be encoded and transferred to other client devices for display in real time. Separating the video image into tiles for encoding uses processing resources more efficiently since tiles that do not require more processing for higher quality (e.g. higher frame rate or higher resolution) are not unnecessarily processed in that manner. This allows a high resolution and high frame rate video stream to be decoded on devices and systems that have more limited processing power. Likewise, less data is used for the video since lower quality aspects of an encoded video file require less information.

Figure 8:
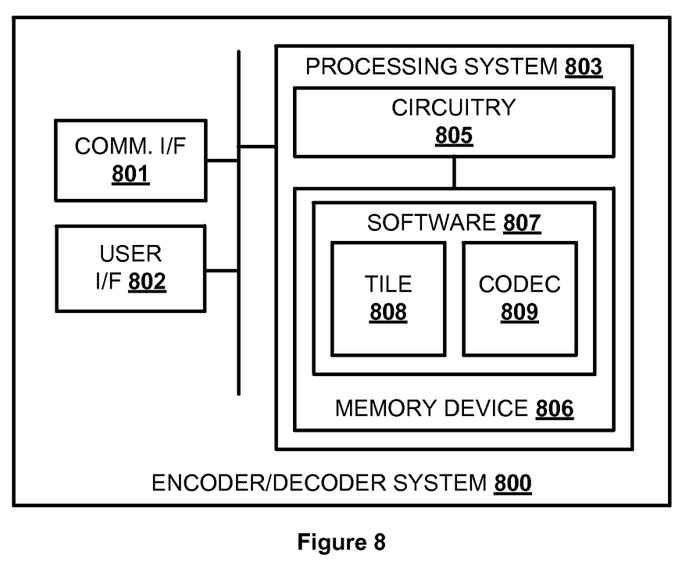
FIG. 8 illustrates a computing architecture in an implementation.

FIG. 8 illustrates a computing architecture 800 that may be used to implement a video encoder system, decoder system, or both. Computing architecture 800 is an example implementation of encoder 101 or decoder 301, although encoder 101 and decoder 301 may use alternative configurations. Similarly, computing architecture 800 is an example implementation of client devices 501 and 502, although devices 501 and 502 may use alternative configurations. Computing architecture 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof. Communication interface 801 may be omitted in some examples.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Operating software 807 comprises computer programs, firmware, or some other form of machine-readable processing instructions. Operating software 807 includes tile segmentation module 808 and codec module 809. Operating software 807 may further include an operating system, utilities, drivers, network interfaces, applications, or some other type of software. When executed by circuitry 805, operating software 807 directs processing system 803 to operate computing architecture 800 as described herein.

In particular, to operate as an encoder of a composite video stream, tile segmentation module 807 directs processing system 803 to identify a first portion of an image of a video stream for encoding using first parameters and a second portion of the image of the video stream for encoding using second parameters, and to segment the first portion of the image into one or more first tiles and the second portion of the image into one or more second tiles. Codec module 809 directs processing system 803 to encode the first tiles using the first parameters and the second tiles using the second parameters and, after the encoding, to combine the first tiles and the second tiles into the composite video stream.

Additionally, to operate as a decoder of a composite video stream, tile segmentation module 807 directs processing system 803 to receive the composite video stream and segment the composite video stream into the first and second tiles. After segmenting, codec module 809 directs processing system 803 to decode the first tiles based on the first parameters and decoding the second tiles based on the second parameters and, after decoding, to combine the first tiles and the second tiles for display of the image of the video stream.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of encoding a composite video stream, comprising:
   in an encoder:
   identifying a first portion of an image of a video stream for encoding using first parameters and a second portion of the image of the video stream for encoding using second parameters, wherein the first parameters comprise a first frame rate and a first resolution and the second parameters include a second frame rate and a second resolution;
   segmenting the first portion of the image into one or more first tiles and the second portion of the image into one or more second tiles;
   after the segmenting, encoding the first tiles using the first parameters and the second tiles using the second parameters; and
   after the encoding, combining the first tiles and the second tiles into the composite video stream.

2. The method of claim 1, wherein the first frame rate is higher than the second frame rate and the first resolution is lower than the second resolution.

3. The method of claim 2, wherein the composite video stream comprises a video having the first frame rate and the second resolution.

4. The method of claim 1, further comprising:
   transferring the composite video stream to a decoder system, wherein the decoder system decodes the composite video stream for display.

5. The method of claim 4, wherein the decoder system segments the composite video stream, based on tile segment information, into the first and second tiles before decoding the first tiles based on the first parameters and decoding the second tiles based on the second parameters.

6. The method of claim 5, further comprising:
   transferring the tile segment information to the decoder system using a supplemental enhancement information (SEI) message.

7. The method of claim 1, wherein the encoding is performed using the H.265 codec.

8. A non-transitory computer readable medium having instructions stored thereon that, when executed by an encoder system, direct the encoder system to perform a method of encoding a composite video stream, the method comprising:

identifying a first portion of an image of a video stream for encoding using first parameters and a second portion of the image of the video stream for encoding using second parameters, wherein the first parameters comprise a first frame rate and a first resolution and the second parameters include a second frame rate and a second resolution;

segmenting the first portion of the image into one or more first tiles and the second portion of the image into one or more second tiles;

after the segmenting, encoding the first tiles using the first parameters and the second tiles using the second parameters; and     after the encoding, combining the first tiles and the second tiles into the composite video stream.

9. The non-transitory computer readable medium of claim 8, wherein the first frame rate is higher than the second frame rate and the first resolution is lower than the second resolution.

10. The non-transitory computer readable medium of claim 9, wherein the composite video stream comprises a video having the first frame rate and the second resolution.

11. The non-transitory computer readable medium of claim 8, wherein the method further comprises:

transferring the composite video stream to a decoder system, wherein the decoder system decodes the composite video stream for display.

12. The non-transitory computer readable medium of claim 11, wherein the decoder system segments the composite video stream, based on tile segment information, into the first and second tiles before decoding the first tiles based on the first parameters and decoding the second tiles based on the second parameters.

13. The non-transitory computer readable medium of claim 12, wherein the method further comprises:

transferring the tile segment information to the decoder system using a supplemental enhancement information (SEI) message.

14. The non-transitory computer readable medium of claim 8, wherein the encoding is performed using the H.265 codec.

15. A non-transitory computer readable medium having instructions stored thereon that, when executed by a decoder system, direct the decoder system to perform a method of decoding a composite video stream, the method comprising:

receiving the composite video stream, wherein the composite video stream comprises a combination of one or more first tiles of an image of a video stream encoded using first parameters and one or more second tiles of the image of the video stream encoded using second parameters, wherein the first parameters comprise a first frame rate and a first resolution and the second parameters include a second frame rate and a second resolution;

after receiving, segmenting the composite video stream into the first and second tiles;

after segmenting, decoding the first tiles based on the first parameters and decoding the second tiles based on the second parameters; and     after decoding, combining the first tiles and the second tiles for display of the image of the video stream.

16. The non-transitory computer readable medium of claim 15, wherein the method further comprises:

receiving tile segment information associated with the composite video stream; and     wherein segmenting the composite video stream is performed based on the tile segment information.

17. The non-transitory computer readable medium of claim 15, wherein the first frame rate is higher than the second frame rate and the first resolution is lower than the second resolution.

* * * * *